(12) United States Patent
Wright

(10) Patent No.: US 9,514,220 B1
(45) Date of Patent: Dec. 6, 2016

(54) GENERATING CONTENT PLACEMENT CRITERIA BASED ON A SEARCH QUERY

(71) Applicant: Joseph Thomas Esmond Wright, London (GB)

(72) Inventor: Joseph Thomas Esmond Wright, London (GB)

(73) Assignee: Google Inc., Mountain View, CA (US)

( * ) Notice: Subject to any disclaimer, the term of this patent is extended or adjusted under 35 U.S.C. 154(b) by 21 days.

(21) Appl. No.: 13/656,418

(22) Filed: Oct. 19, 2012

(51) Int. Cl.
*G06F 17/30* (2006.01)

(52) U.S. Cl.
CPC .............................. *G06F 17/30669* (2013.01)

(58) Field of Classification Search
CPC ....................................................... G06F 17/00
See application file for complete search history.

(56) References Cited

U.S. PATENT DOCUMENTS

| | | | |
|---|---|---|---|
| 5,813,014 A * | 9/1998 | Gustman | |
| 6,915,294 B1 * | 7/2005 | Singh et al. | |
| 7,721,230 B2 * | 5/2010 | Sawyer | 715/853 |
| 7,778,872 B2 * | 8/2010 | Kamangar et al. | 705/14.52 |
| 7,779,147 B1 * | 8/2010 | Wang et al. | 709/235 |
| 7,809,801 B1 * | 10/2010 | Wang et al. | 709/217 |
| 7,860,706 B2 * | 12/2010 | Abir | G06F 17/2872 704/4 |
| 7,873,630 B2 * | 1/2011 | Arrouye | G06F 17/30126 707/715 |
| 8,220,018 B2 * | 7/2012 | de Andrade | H04N 5/44543 725/32 |
| 8,260,677 B1 * | 9/2012 | Leahy et al. | 705/26.1 |
| 8,301,447 B2 * | 10/2012 | Yoakum et al. | 704/254 |
| 8,335,721 B2 * | 12/2012 | Samdadiya | G06Q 30/02 705/14.73 |
| 8,341,143 B1 * | 12/2012 | Karls et al. | 707/708 |
| 8,392,392 B1 * | 3/2013 | Ruf | 707/706 |
| 8,521,598 B1 * | 8/2013 | Samdadiya | G06Q 30/02 705/14.73 |
| 8,554,779 B1 * | 10/2013 | Batali | G06F 21/6254 707/757 |
| 8,577,910 B1 * | 11/2013 | Hodge | G06F 17/30 706/11 |
| 8,583,675 B1 * | 11/2013 | Haahr | G06F 17/30442 707/721 |
| 8,943,533 B2 * | 1/2015 | de Andrade | 725/32 |
| 2003/0023485 A1 * | 1/2003 | Newsome | G06Q 30/02 705/14.66 |

(Continued)

*Primary Examiner* — Farhan Syed
(74) *Attorney, Agent, or Firm* — John D. Lanza; Foley & Lardner LLP

(57) ABSTRACT

Systems and methods of providing information via a computer network are provided. A data processing system can receive a search query via the computer network. Search results can be identified responsive to the search query and provided for display at a computing device. The search results can include content items. The data processing system can receive a request to generate placement criteria responsive to display of the search query at the computing device. Based at least in part on the request, the data processing system can determine a first criterion based on the search query, and a second criterion based on at least one of the search results and the content items. Based at least in part on this data, the data processing system can generate the placement criteria, which can include at least one of the first criterion and the second criterion.

23 Claims, 4 Drawing Sheets

(56) References Cited

U.S. PATENT DOCUMENTS

| | | | |
|---|---|---|---|
| 2005/0137939 A1* | 6/2005 | Calabria et al. | 705/26 |
| 2005/0144064 A1* | 6/2005 | Calabria et al. | 705/14 |
| 2005/0188402 A1* | 8/2005 | de Andrade | H04N 5/44543 725/46 |
| 2006/0195799 A1* | 8/2006 | Sawyer | 715/853 |
| 2007/0067215 A1* | 3/2007 | Agarwal et al. | 705/14 |
| 2007/0203891 A1* | 8/2007 | Solaro et al. | 707/3 |
| 2007/0233503 A1* | 10/2007 | Meyer et al. | 705/1 |
| 2008/0222108 A1* | 9/2008 | Prahlad et al. | 707/3 |
| 2009/0094210 A1* | 4/2009 | Reinhardt et al. | 707/3 |
| 2009/0210385 A1* | 8/2009 | Ramaswamy | G06Q 30/02 |
| 2009/0271260 A1* | 10/2009 | Sharma et al. | 705/14 |
| 2009/0327346 A1* | 12/2009 | Teinila | G06Q 30/02 |
| 2010/0082422 A1* | 4/2010 | Heilig | G06Q 30/0242 705/14.41 |
| 2010/0094630 A1* | 4/2010 | Yoakum | 704/254 |
| 2010/0235446 A1* | 9/2010 | Hehmeyer et al. | 709/205 |
| 2010/0274802 A1* | 10/2010 | Abe | 707/769 |
| 2011/0161308 A1* | 6/2011 | Andersen et al. | 707/707 |
| 2011/0295678 A1* | 12/2011 | Seldin et al. | 705/14.42 |
| 2012/0246682 A1* | 9/2012 | de Andrade | H04N 5/44543 725/45 |
| 2013/0232135 A1* | 9/2013 | Vidra | 707/722 |
| 2014/0006407 A1* | 1/2014 | Rabii | G06F 17/30867 707/738 |

* cited by examiner

GENERATING CONTENT PLACEMENT CRITERIA BASED ON A SEARCH QUERY

BACKGROUND

In a computer networked environment such as the internet, entities such as people or companies provide information for public display on documents such as web pages. The documents can include information provided by the entities via a web page server for display on the internet. Content can also be provided by third parties for display on the documents together with the information provided by the entities. Thus, a person viewing a document can access the information that is the subject of the document, as well as third party content that may or may not be related to the subject matter of the document.

SUMMARY

At least one aspect is directed to a computer implemented method of providing information for use in a computer network based content placement campaign. The method receives, by a data processing system via the computer network, a search query. The search query can include a keyword. The method identifies, responsive to the search query and based at least in part on the keyword, search results. The search results can include a plurality of content items. The method provides the search results for display on a display document at a computer device. The display document can include a placement criteria generation interface. The method receives, by the data processing system and based on input into the placement criteria generation interface, a request to generate placement criteria, responsive to display of the search results at the computing device. The method determines a first criterion based on at least one of the search query and the keyword of the search query, and determines a second criterion based on at least one of the search results and the plurality of content items. The method generates the placement criteria. The placement criteria can include at least one of the first criterion and the second criterion.

At least one aspect is directed to a system of providing information via a computer network. The system includes one or more data processors, and one or more storage devices storing instructions that when executed by the one or more data processors, cause the one or more data processors to perform operations. The operations receive, via the computer network, a search query. The search query can include a keyword. The operations identify, responsive to the search query and based at least in part on the keyword, search results including a plurality of content items. The operations provide the search results for display on a display document at a computing device. The operations receive, responsive to display of the search results at the computing device, a request to generate placement criteria, and determine a first criterion based on at least one of the search query and the keyword of the search query. The operations determine a second criterion based on at least one of the search results and the plurality of content items. The operations generate the placement criteria. The placement criteria can include at least one of the first criterion and the second criterion.

At least one aspect is directed to a computer readable storage medium device storing instructions that when executed by one or more data processors, cause the one or more data processors to perform operations. The operations include operations to receive a search query, and identify search results responsive to the search query. The operations include operations to provide the search results for display at a computing device. The operations include operations to receive, responsive to display of the search results at the computing device, a request to generate placement criteria, and determine a first criterion based at least in part on the search query. The operations include operations to determine a second criterion based at least in part on the search results and generate the placement criteria. The placement criteria can include at least one of the first criterion and the second criterion.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
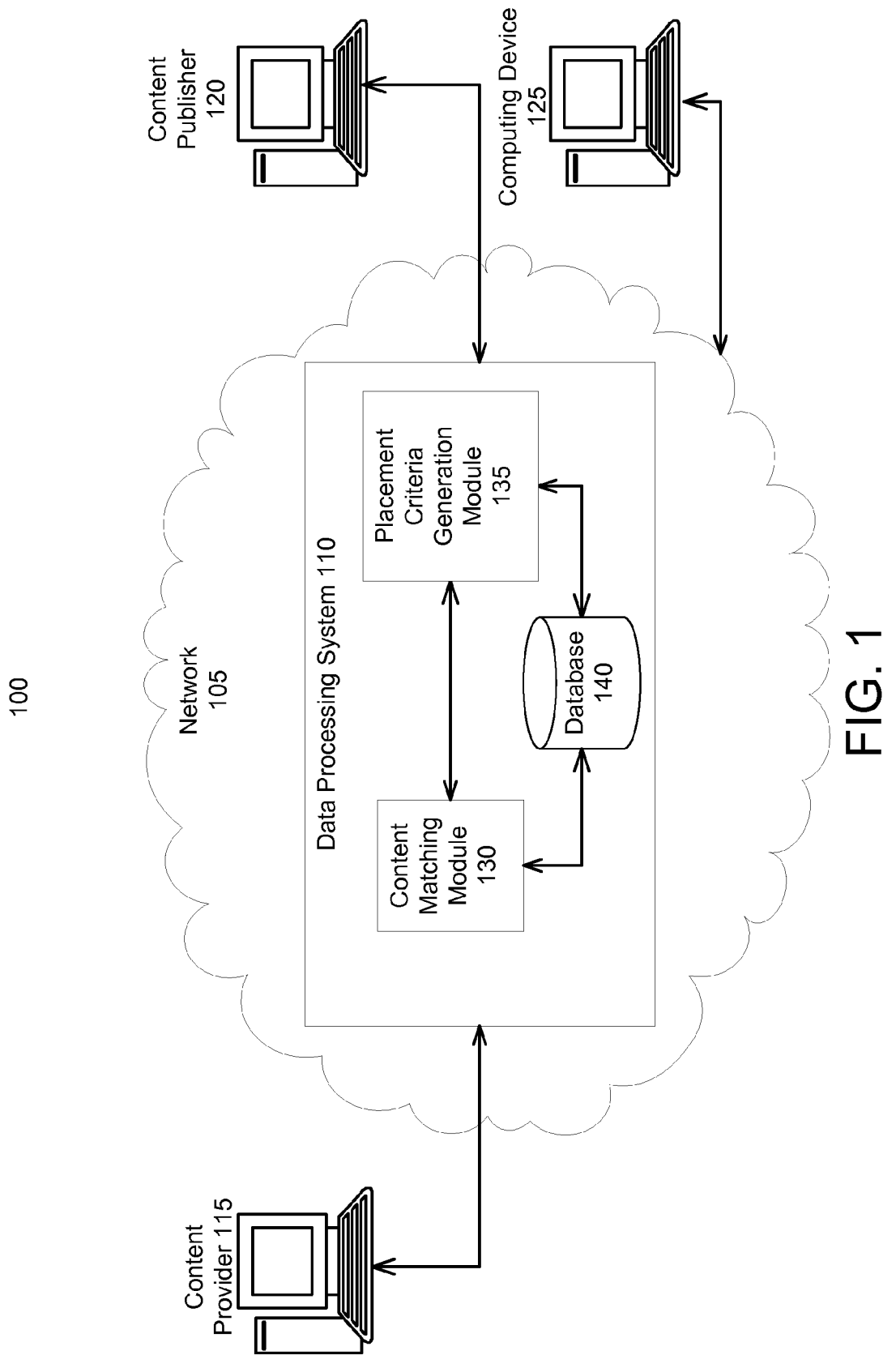
FIG. 1 is a block diagram depicting an example environment to provide information via a computer network, according to an illustrative implementation.

Following below are more detailed descriptions of various concepts related to, and implementations of, methods, apparatuses, and systems for providing information via a computer network. The various concepts introduced above and discussed in greater detail below may be implemented in any of numerous ways, as the described concepts are not limited to any particular manner of implementation. Examples of specific implementations and applications are provided primarily for illustrative purposes.

A user of a computing device can request access to a document such as a web page or enter a search query into an interface of a web page. Data processing systems can evaluate this data, for example by identifying keywords from the search query and matching them with placement criteria of content items (e.g., ads) provided by a content provider (e.g., an advertiser or promoter). The data processing systems can determine that the subject matter of the content items is sufficiently similar to the search query or data from a request to access the web page, and based on this similarity the data processing system can select content items as candidates for display on web pages or other documents, responsive to the request for web page access or responsive to the search query. The candidate content items may be provided for display in a content slot of a web page, for example.

A content provider such as an advertiser can implement an online campaign to place content items on web pages for display on computing devices. The content provider can communicate with a data processing system to provide placement criteria used to place the content provider's content items. The placement criteria, for example, can include keywords or other index terms that generally indicate subject matter related to the content items or otherwise of interest to the content provider. The content providers may be uncertain as to what placement criteria to provide to the data processing system, or they may provide non-optimal placement criteria.

Some implementations are directed toward generating placement criteria used to place content items (e.g., advertisements) on an information resource (e.g., a web page or other document) of a computer network such as the internet. The placement criteria associated with the content items can be used by the data processing system to select the content items for placement on an information resource (e.g., web page) of the network. For example, the placement criteria can be evaluated by the data processing system to identify the content items as being suitable for placement on content web pages responsive to a request by a computing device to access the content web page, or for placement on search engine result landing web pages responsive to a search query received by a search engine.

In some implementations, to identify placement criteria to use as part of a content placement campaign, the content provider (via a computing device and computer network) can provide a search query to the data processing system. The search query, for example, can include keywords or other terms that the content provider determines are generally relevant to the subject matter of the content provider's content items.

The data processing system can respond to the search query by identifying search results and providing them for display at a computing device of the content provider. The search results can include information resources such as resource locators, links to information resources, documents, content items, advertisements, web pages or other data. The content provider can determine that the search results are relevant to the content items that the content provider has selected for an online content placement campaign, (e.g., the content provider likes the search results and considers them relevant). The content provider can communicate with the data processing system to indicate that the content provider would like to place content items on the same or similar information resources as those returned responsive to the search query. For example, the search results can be displayed by a search results landing web page (or other document) that includes a user interface, and the content provider can provide input into the user interface of the web page to indicate an interest in generating placement criteria. Responsive to this indication, the data processing system can evaluate the search query (including its keywords or other terms) as well as characteristics of the search results of the search query to generate placement criteria. The data processing system can use the generated placement criteria to identify information resources as being suitable for placement of the content provider's content items, for example as part of a content placement campaign.

Thus, rather than provide placement criteria, the content provider can provide a search query. If the content provider is satisfied with the results of the search query, the content provider can instruct the data processing system to generate placement criteria that can be used by the data processing system to place the content provider's content items on information resources included in the same or similar search results, or responsive to the same or similar search queries.

FIG. 1 illustrates an example system 100 for providing information via at least one computer network, such as the network 105. The network 105 can include computer networks such as the internet, local, wide, metro or other area networks, intranets, satellite networks, and other computer networks such as voice or data mobile phone communication networks. The system 100 can also include at least one data processing system 110, e.g., at least one logic device such as a computing device having a processor to communicate via the network 105, for example with at least one content provider 115, at least one content publisher 120, or at least one computing device 125.

The content provider 115 can include servers or other computing devices operated by a content provider entity to provide content items such as advertisements for display on information resources at the computing device 125. The content provided by the content provider 115 can include third party content items (e.g., ads) for display on information resources such as a web page that includes primary content, e.g. content provided by the content publisher 120. The content items can also be displayed on a search results web page. For example, the content provider 115 can provide or be the source of ads or other content items for display in content slots of content web pages such as a web page of a company where the primary content of the web page is provided by the company, or for display on a search results landing page provided by a search engine. The content items of the content provider 115 can be displayed on information resources other than web pages, such as content displayed as part of the execution of an application on a smartphone or other computing device 125.

The content publisher 120 can include servers or other computing devices operated by a content publishing entity to provide primary content for display via the network 105. For example, the content publisher 120 can include a web page operator who provides primary content for display on the web page. The primary content can include content other than that provided by the content provider 115, and the web page can include content slots configured for the display of third party content items (e.g., ads) from the content provider 115. For example, the content publisher 120 can operate the website of a company and can provide content about that company for display on web pages of the website. The web pages can include content slots configured for the display of third party content items such as ads of the content provider 115. In some implementations, the content publisher 120 includes a search engine operator that operates a search engine website. The primary content of search engine web pages (e.g., a results or landing web page) can include results of a search query as well as third party content items displayed in content slots.

The computing device 125 can include computing devices configured to communicate via the network 105 to display data such as the content provided by the content publisher 120 (e.g., primary web page content) and the content provided by the content provider 115 (e.g., third party content items such as ads configured for display in a content slot of a web page). The computing device 125 can include desktop computers, laptop computers, tablet computers, smartphones, personal digital assistants, and other computing devices. The computing device 125 can include user interfaces such as microphones, speakers, touchscreens, keyboards, pointing devices, a computer mouse, touchpad, or other input or output interfaces.

The data processing system 110 can include at least one server. For example, the data processing system 110 can include a plurality of servers located in at least one data center or server farm. In one implementation, the data processing system 110 includes a content placement system. For example, the data processing system 110 can include at least one content matching module 130, at least one placement criteria generation module 135, and at least one database 140. The content matching module 125 and the placement criteria generation module 135 can each include at least one processing unit, server, circuit, engine, or other logic device such as programmable logic arrays configured to communicate with the database 140 and with other computing devices (e.g., the content provider 115, the content publisher 120, or the computing device 125) via the network 105. The content matching module 130 and the placement criteria generation module 135 can be separate components, a single component, or part of the data processing system 110.

The data processing system 110 can include the content matching module 130 and the placement criteria generation module 135 as part of one or more servers of a content placement system to generate placement criteria used to identify content items as candidates for display at the computing device 125. For example, the placement criteria generation module 135 can be part of a server in a content placement system configured to determine placement criteria based on input received from the content provider to provide placement criteria corresponding to search query results previously provided to the content provider 115. The placement criteria generation module 135 can be part of the same or a different server in the content placement system. The placement criteria generation module 135 can evaluate a search query and corresponding search results to determine the placement criteria for use in a network 105 based content item placement campaign. For example, the placement criteria generation module 135 can identify keywords based on the subject matter of search results provided to the content provider 115, or based on the search query received from the content provider that the content matching module 130 evaluated to determine the search results. The placement criteria generation module 135 can determine placement criteria that, when implemented responsive to a search query or request to access an information resource, can be used to select the content items as candidates for placement on the search query results or other information resource.

In some implementations, the data processing system 110 receives a search query. For example, the data processing system 110 can receive a search query including at least one keyword from the content provider 115 via the network 105. The keyword can include, for example, at least one word, identifier, phrase, index term, subject term, subject heading, tag, data string, or descriptor that can be evaluated by the data processing system 110 for information retrieval purposes, e.g., to identify content items responsive to the search query. For example, the content provider 115 may be a locksmith wishing to initiate a content item placement campaign (e.g., an ad campaign) to provide online advertisements in the city of London. In this example, the content placement campaign can provide content items for display on computing devices 125 when the computing devices 125 are engaged in activity on the network 105 generally related to locksmith activities. The content provider 115 may intend to place a content item on the computing device 125 responsive to the computing device 125 requesting access to a web page of the content publisher 120, where the web page has subject matter about home security, or lock installation, or accidental lockout services, for example.

Continuing with this example, the content provider 115 can enter a search query, for example having the keywords "locksmith deadbolt and home security in England" into an interface of a search engine information resource (e.g., a web page having a window for data entry) operated by the data processing system 110. The content provider 115 can indicate to the data processing system 110 that the results of the search query return information resources that are consistent with (or the same as) information resources where the content provider 115 would like to place content items.

The data processing system 110 can respond to the search query. For example, the content matching module 130 can evaluate the keyword or other content of the search query to identify search results. The search results can include subject matter similar to subject matter indicated by the keyword. For example, the data processing system 110 can identify search results including web pages, links, documents, content items, advertisements, or combinations thereof or other information resources about locksmiths located in or around London. The data processing system 110 can provide the search results for display at the content provider 115 on a search results web page (or other document).

In some implementations, the data processing system 110 receives a request to generate placement criteria. For example, via the network 105, the data processing system 110 can receive an indication from the content provider 115 to determine placement criteria that can be used to place content items on web pages or other information resources. The placement criteria can include keywords or other index terms or identifiers that indicate subject matter associated with ads or other content items that the content provider 115 offers for placement on information resources. In one implementation, the data processing system 110 uses the placement criteria to select content items of the content provider 115 for display via the network 105 on information resources at the computing devices 125.

The data processing system 110 can provide the search results for display at a computing device of the content provider 115. In one implementation, the content provider 115 determines whether or not the search results are the type of search results (e.g., have appropriate subject matter or content publishers 120) where the content provider 115 would like to place content items. With reference to the above example, search results having subject matter about locksmith services may be of interest to the content provider 115.

Figure 2:
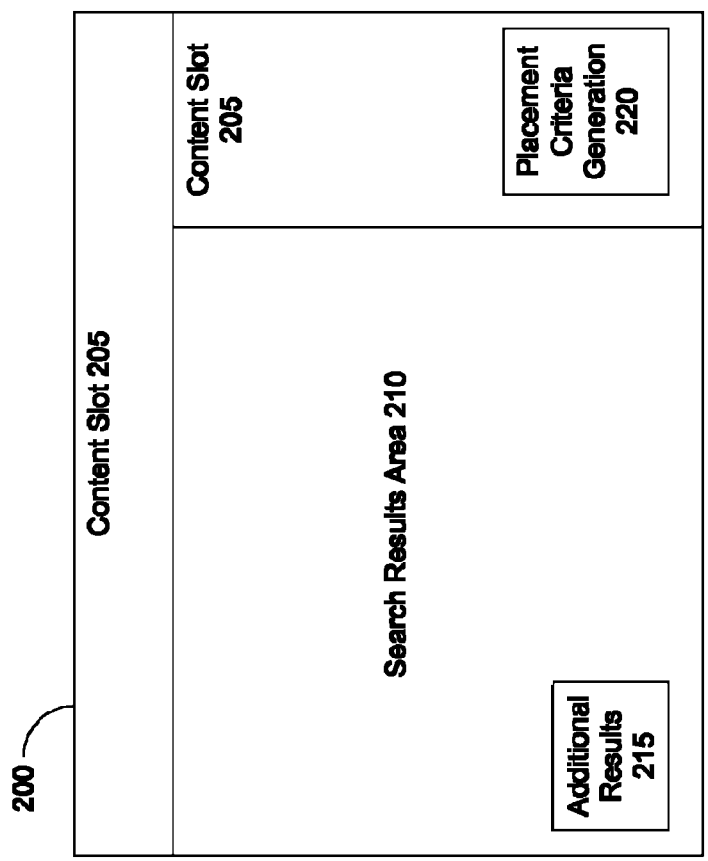
FIG. 2 is a display depicting a computing device interface for providing information via a computer network, according to an illustrative implementation.

Referring to FIG. 2, in some implementations the search results can be displayed as a display document 200 rendered at the content provider 115. The display document 200 can include at least one search results landing web page or other information resource to display search results or receive input, for example from the content provider 115. The search results can be displayed on a graphical user interface at the content provider 115 (e.g., on a computing device). The display document 200 can include at least one content slot 205, at least one search results area 210, at least one additional results interface 215, and at least one placement criteria generation interface 220. The configuration depicted in FIG. 2 is an example. The content slots 205, search results area 210, additional results interface 215, or placement criteria generation interface 220 can be absent from the display document 200 or can be located at various areas of the display document 200. In some implementations, the search results can be provided for display on information resources other than web pages.

The content slots 205 can include areas of the display document 200 where content items such as advertisements are displayed. The content slots 205 can be located at various areas of the display document 200, such as in a banner position along the top, or along the sides of the display document 200. One content slot 205 can accommodate one or more content items. The search results area 210 can also include content items. For example, the content matching module 115 can return links, uniform resource locators, snippets or other pieces of content that indicate subject matter provided by content publishers 120. A user (e.g., the content provider entity at the content provider computing device 115) can click a link for content in the search results area to access corresponding additional content, such as a web page represented by the link. In one implementation, the content slots 205 accommodate paid advertisements and the search results area 210 accommodates links or other indicators of content such as primary content web pages provided by the content publishers 120.

The additional results interface 215 can include a button, link, switch, input box, or other interface that a user can click, access, or enter input into in order to cause the data processing system 110 to provide a second rendering of search results, such as a second rendering of the display document 200 that includes different content than the first rendering.

The placement criteria generation interface 220 can include a button, link, switch, input box, or other interface that a user can click, access, or enter input into in order to communicate with the data processing system 110. In some implementations, the placement criteria generation interface 220 is used by the content provider 115 to indicate to the data processing system 110 that the content provider entity corresponding to the content provider 115 is satisfied with the search results and would like to direct a content item placement campaign toward the same or similar search results. For example, the content provider entity can click or otherwise manipulate the placement criteria generation interface 220 when the content provider entity 220 is pleased with the search results. The similar search results can include, for example, content that the content matching module 130 identifies as satisfying the search query but that were not rendered for display with the search results at the content provider 115. In some implementations, the placement criteria generation interface 220 displays a phrase such as "advertise on this search" or "generate placement criteria" or other phrase or prompt to the content provider entity. In this example, where the content provider 115 views search results displayed on the display document 200, the content provider entity can view the search results from the perspective of a customer or potential recipient of the content provider's content items.

In some implementations, the data processing system 110 (or component thereof) determines the placement criteria based on the search query received from the content provider 115, the search results that the data processing system 110 identifies responsive to the search query, or combinations thereof. For example, the placement criteria generation module 135 can evaluate keywords of the search query and select one or more of the keywords as a placement criterion. In some implementations, the data processing system identifies a term or portion of a keyword as a placement criterion. For example, the keyword can be a phrase such as "cheap London locksmith", and the placement criteria generation module 135 can select the term "locksmith" as a placement criterion. In some implementations, the placement criteria generation module 135 selects keywords as placement criteria based on performance metrics associated with the keyword, such as a click through rate or click through volume of the keyword.

The placement criteria generation module 135 can also identify placement criteria based on other subject matter related to the search query received from the content provider 115. For example, data obtained with the search query can indicate other information about the content provider such as location data, data about the format of the content items of the content provider 115, or types of computing devices (e.g., desktop computers, tablet computers, or smartphones) preferred by the content provider 115 for the placement of content items.

In some implementations, the placement criteria generation module 135 determines placement criteria based on the search results provided for display to the content provider 115. For example, subsequent to providing search results to the content provider 115, the data processing system 110 can receive a request to generate placement criteria, and can evaluate the subject matter of the search results to identify placement criteria. The subject matter of the search results can include content items displayed in the content slot 205. The placement criteria generation module 135 can identify placement criteria from the search results that are displayed on the display document 200, or from search results that were identified by the data processing system 110 as candidates for display on the display document 200, but that were not actually provided for display.

In some implementations, the placement criteria generation module 135 evaluates content of subject matter represented on the display document 200 to generate placement criteria. For example, a link or content snippet displayed on the display document 200 can represent a web page of the content publisher 120. In addition to generating placement criteria from the link or content snippet (or corresponding data), the data processing system 110 can identify placement criteria from the web page represented by the link. For example, the data processing system 110 can identify as placement criteria words that appear in content on the web page, but that do not appear in the link (e.g., in search results area 210).

The placement criteria generation module 135 can also generate placement criteria based on content items appearing in the content slots 205, for example, by identifying keywords of the content items. In some implementations, responsive for example to an activation of the placement criteria generation interface 220, the data processing system 110 can generate placement criteria from keywords of content items selected by the data processing system 110 as candidates for display with the search results. The keywords in this example may or may not be displayed with the search results at the content provider 115.

In some implementations, the placement criteria includes at least one criterion generated based on an analysis of the search results or content items identified as candidates for display with the search results, as well as at least one criterion generated based on the search query or keywords of the search query that led to the search results. For example, the data processing system 110 can identify a keyword received from the content provider 115 as a placement criterion, and a different keyword of one of the content items from the search results, and can include these two keywords as placement criteria for use in a content placement campaign implemented by the data processing system 110 for or on behalf of the content provider 115.

The placement criteria determined or generated by the data processing system 110 can include keywords that are the same as or different than keywords received with the search query that can be used to generate the placement criteria. For example, the search query received from the content provider 115 can include the keywords "locks and home security in London". Based on the search query or the search results, in this example, the placement criteria generation module 135 can generate placement criteria having the different keywords "southern England locksmith services". The keywords of the search query and keywords of the placement criteria generated responsive to the search query can be mutually exclusive, partially the same, overlapping, or identical.

In one implementation, the placement criteria are used by the data processing system 110 to provide content items (e.g., ads obtained from the content provider 115) for display at computing device 125. For example, the data processing system 110 can receive a search query from the computing device 125, and can determine based on the placement criteria that a corresponding content item is responsive to the search query. The data processing system 110 can select this content item as a candidate for display on an information resource at that computing device 125. In some implementations, the computing device 125 can communicate with the content publisher 120, via the network 105 to request access to a web page (or other document) of the content publisher 120. Responsive to the request, the content publisher 120 or the computing device 125 can communicate with the data processing system 110 to request content items for display with the web page at the computing device 125. In this example, the data processing system 110, or a component thereof such as the content matching module 130, can determine that the placement criteria represents a content item suitable for display with the web page, and can select the content item as a candidate for display with on the web page at the computing device 125. In this example, the content item is responsive to the search query, for example because at least a portion of the placement criteria relates to subject matter of the search query. In some implementations, this and other candidate content items can enter a bid auction where all or some of the candidate content items are selected and provided for display at the computing device 125.

In some implementations, the placement criteria generation module 135 generates placement criteria based on a plurality of search results. For example, one or more content providers 115 can provide search queries, receive search results, and manipulate the placement criteria generation interface 220 to instruct the data processing system 110 to generate (e.g., identify) placement criteria. In this example, the placement criteria generation module 135 can evaluate more than one search query or more than one search result to determine placement criteria. For example, the placement criteria generation module 135 can select a keyword from a first search query and a keyword from search results to a different second search query, (or a keyword from the second query) as having click through rates sufficiently high (e.g., above a threshold or relative to other click through rates of other keywords from the search queries or search results) to be selected as placement criteria.

In one implementation, keywords or other data of search queries (e.g., from the content provider 115) or search results (e.g., provided to the content provider 115) can be excluded by the data processing system 110 from the placement criteria. For example, the placement criteria generation module 135 can determine that a click through rate of a keyword to insufficient for inclusion as a placement criterion, or that the keyword is otherwise determined to be ambiguous or of low quality for identifying content items as candidates for placement on information resources.

In some implementations, the data processing system can analyze additional parameters that can identify or characterize information resources suitable for placement of content items. For example, the additional parameter may include a search term, a geographic location, data about other content providers 115, websites listed in the search results area 210, or combinations thereof.

For instance, in the foregoing example of a locksmith, if the search query from the content provider 115 includes the keyword "locksmith," the data processing system can identify "locksmith" as a placement criterion for the online content item placement campaign. In this example, the data processing system 110 can analyze the search results and related content for other ways of expressing the keyword "locksmith." For example, the data processing system 110 may analyze terms such as "locked out" or "new keys" and determine their applicability to the content item placement campaign. In some implementations, the data processing system 110 analyzes the relevance (e.g., applicability to the campaign) of terms related to a generic potential class of recipients of the content items during implementation of the placement campaign. In this example, the data processing system 110 may identify interests of the generic audience of recipients interested in a locksmith to identify placement criteria such as "hardware store" or "handyman" for example.

The data processing system 110 may analyze additional parameters that may be related to the search query, such as the geographic location of the content provider 115. The location may be related to the selected audience (e.g., where the content provider 115 would like the audience to be located) or where the content provider (or good or service offered by the content provider) is located. For example, the location may be related to the location of the locksmith (e.g., London), or it may be related to that of the content provider 115 or computing device 125 accessing information resources having, for example ".co.uk" ".com" ".cn" or other top level domain names.

The additional parameters evaluated by the placement criteria generation module 135 to generate placement criteria can be determined from historical data related to the keywords or the search results, such as bid values or click through rates of content items selected as candidate search results or provided for display on the display document 200, or data indicating competing content providers of other content items included in the search results have business, size of business, location of business or other similarities to the content provider 115 that is in the process of generating the placement criteria for the online campaign.

The keywords used to create the placement criteria can be identified from various sources. For example, the data processing system 110 may prompt the content provider 115 for information, which can be analyzed in conjunction with the information obtained or extracted from the search results or from the search query. In one implementation, the data processing system prompt the content provider 115 for input regarding the user's website URL or its specific industry or trade. In some implementations, the placement criteria can be determined as a result of machine learning that is developed while the data processing system 110 is running and generating online campaigns. For instance, the data processing system 110 can undergo an iterative process to use the information related to a content placement campaign as new keywords can be used as placement criteria to generate or improve the campaign.

The data processing system 110 can create other components of the content placement campaign in addition to the placement criteria. For example, the data processing system 110 can prompt the content provider 115 for data used to generate campaign settings, suggest cost per click price ranges or budgets, or combinations thereof. For example, the data processing system 110 can perform a historical analysis of winning bids for identified keywords to suggest cost per click settings of a content placement campaign.

In some implementations, the data processing system 110 can solicit feedback from the content provider 115 regarding the generation of the online content placement campaign. For example, the data processing system 110 can present the content provider 115 with placement criteria or other components of the online campaign, and can prompt the content provider 115 to provide feedback. The content provider 115 can modify the placement criteria or other components of the online campaign. For example, the content provider can specify generic characteristics regarding the type of audience as desired recipients of the content items. In some implementations, the content provider 115 can adjust cost per click or other settings (e.g., bid settings) of the content placement campaign. In one example, the online content placement campaign may be selected based at least in part on geographic location, determined for example by such as by the uniform resource locator or internet protocol address of the content provider 115 or computing device 125.

In some implementations, the data processing system 110 can receive a search inquiry from the content provider 115, and in response can provide search results for display to the content provider 115. The data processing system 110 can receive an input from the content provider 115 instructing the placement of content items on information resources that are the same or similar (e.g., semantically or by subject matter) to the search results. The data processing system 110 can evaluate the search query (e.g., keywords), the search results (e.g., the content, keywords, metadata, or other data of the information resources) and based on this information the data processing system 110 can generate placement criteria for the content provider 115. In this example, the content provider 115 indicates the types of search results of interest to the content provider 115 to place content items. The data processing system 110 can use the placement criteria to select content items as candidates for placement on information resources, for example by determining that a search query satisfies the placement criteria.

Figure 3:
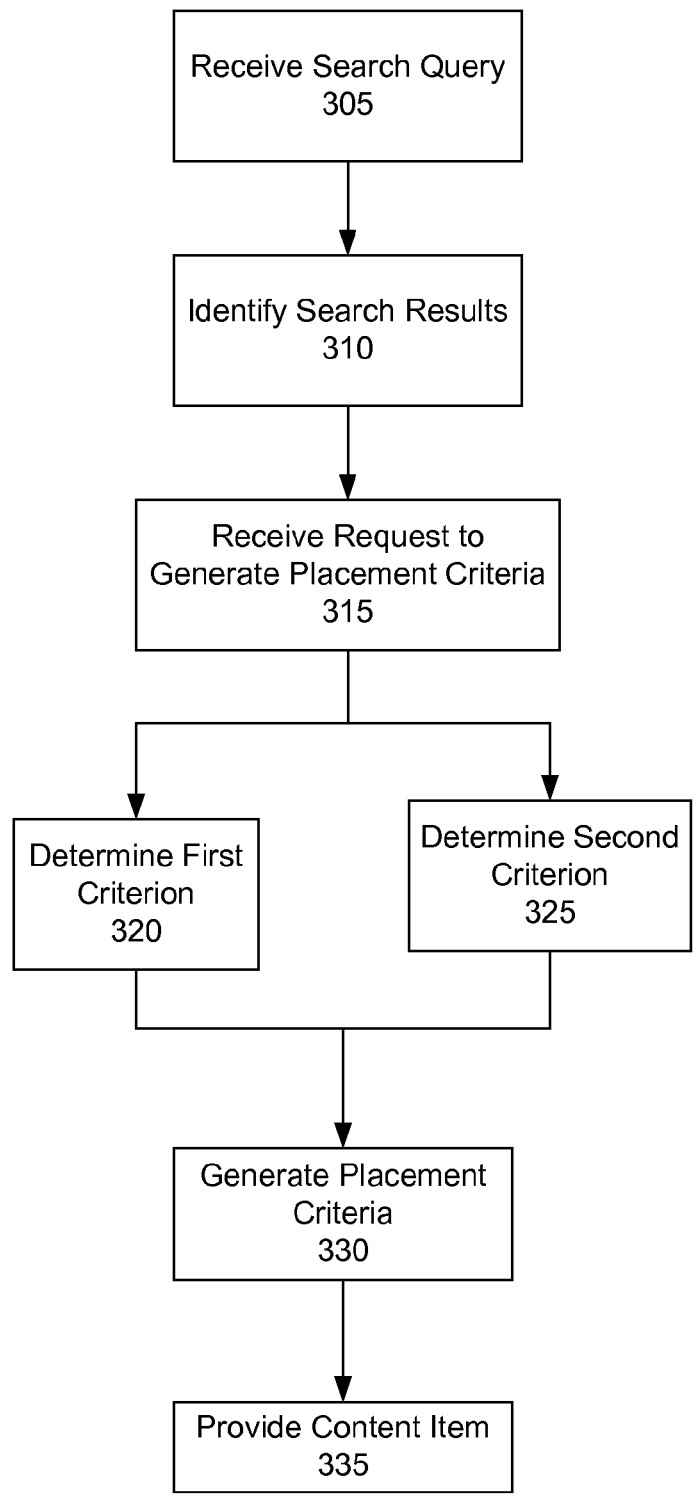
FIG. 3 is a flow diagram depicting a method of providing information via a computer network, according to an illustrative implementation.

FIG. 3 illustrates a flow diagram depicting a method 300 of providing information via a computer network, according to an illustrative implementation. The method 300 can be implemented by the data processing system. In one implementation, the method 300 receives a search query (BLOCK 305). For example, via a computer network, the data processing system can receive a search query that includes at least one keyword (BLOCK 305). The search query can be received (BLOCK 305) from a content provider by a data processing system via a computer network.

Responsive to receiving the search query (BLOCK 305), in one implementation, the method 300 can identify search results (BLOCK 310). The search results can be responsive to the search query. The data processing system can evaluate keywords or other data received with the search query to identify search results (BLOCK 310). The search results can include content having subject matter that is the same, similar to, or overlapping with subject matter indicated by the keyword. In some implementations, the search results are configured for display on an information resource. For example, the search results can include content items (e.g., ads) configured for display on web pages (e.g., in third party content slot of a web page), a website, domain name, or other information resource or network document such as an application executing on a smartphone. The search results can be provided for display. For example, the data processing system can provide the search results via the computer network for display on a display document (e.g., a search results landing web page) at a computing device, such as the computing device of a content provider that generates the search query that can be received (BLOCK 305) by the data processing system.

In some implementations, the method 300 receives a request to generate placement criteria (BLOCK 315). For example, the data processing system can receive the request to generate placement criteria (BLOCK 315) from a content provider via a computer network as part of a process to implement an online content item placement campaign whereby the content provider advertises on information resources displayed on computing devices via the computer network.

In one implementation, to receive the request (BLOCK 315), the data processing system provides a prompt or interface for display at the content provider computing device. The interface can be provided, for example, for display with the search results to the content provider, (e.g., as part of a landing web page or other display document). At the content provider computing device, the content provider entity can manipulate the interface (e.g., click a button) to send a request to generate placement criteria. For example, the content provider may consider the search results to be the type of search results relevant to that content provider's content items, and may decide to use placement criteria that return the same or similar search results responsive to other search queries.

In some implementations, the method 300 generates the placement criteria. For example, the data processing system can determine a first criterion (BLOCK 320) and determine a second criterion (BLOCK 325). The data processing system can evaluate the received search query (BLOCK 305) including components thereof such as keywords, the identified search results (BLOCK 310) including components thereof such as content items (including links to content web pages or the content of those web pages) or data about content providers or those content items, to generate the placement criteria. For example, the data processing system can evaluate quality metrics or historical data (e.g., click through or conversion rates) of keywords to identify at least one keyword for inclusion in the placement criteria. In some implementations, the method 300 determines at least one criterion by evaluating the search query or at least one keyword of the search query (BLOCK 320). The method 300 can also determine at least one criterion by evaluating the search results or content items included with the search results (BLOCK 325). The method 300 can generate the placement criteria (BLOCK 330) including the criteria identified by evaluating the search query (BLOCK 320) or the search results (BLOCK 325). In some implementations, the generated placement criteria include at least one criterion determined from an evaluation of both the search query and the search results.

The placement criteria can be used to select content items for placement on information resources (BLOCK 335). For example, with the placement criteria generated (BLOCK 330), responsive to a subsequent search request, the data processing system can select a content item as a candidate for display on an information resource at a computing device based on the placement criteria. This content item can be a different content item than the content items included in the identified search results (BLOCK 310). For example, the selected content item (BLOCK 335) may include a content item from one content provider, and the content items included in the identified search results may include content items from other, different content providers.

In some implementations, the data processing system determines that the selected content item (BLOCK 335) matches the placement criteria. For example, the selected content item (BLOCK 335) may have subject matter determined by the data processing system to be similar to subject matter indicated by the placement criteria. For example, a user at a computing device may enter a search query for "locksmith services" as input into the data processing system, (which may include a search engine) or the user may request access to a web page or other document of a content publisher about locks. The data processing system can receive the search query. The placement criteria in this example may include keywords about keys or locks, for example, and the data processing system can identify a partial or exact match between the search query and the placement criteria to identify the content item (e.g., an ad) as a candidate for display at the computing device (BLOCK 335). This identified content item (BLOCK 335) can be entered into an auction with other candidate content items that may be responsive to the search query, with some of these content items being provided for display at the computing device (e.g., on a web page) responsive to the search query. For example, one or more of the candidate content items can be selected for display based on the nature or strength of the match, or the monetary amount that a content provider is willing to pay to have their content item provided for display.

Figure 4:
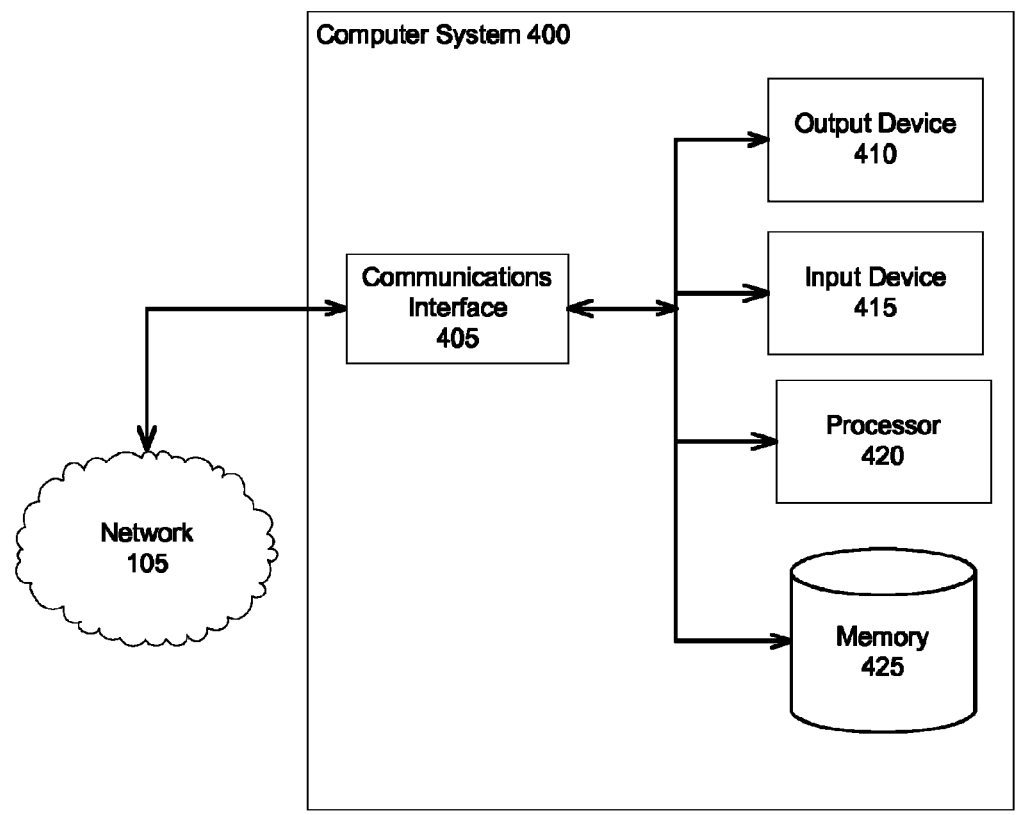
FIG. 4 is a block diagram illustrating a general architecture for a computer system that may be employed to implement various elements of the systems and methods described and illustrated herein, according to an illustrative implementation.

FIG. 4 shows the general architecture of an illustrative computer system 400 that may be employed to implement any of the computer systems discussed herein (including the system 100 and its components such as the data processing system 110, the content matching module 130, or the placement criteria generation module 135 of FIG. 1) in accordance with some implementations. The computer system 400 can be used to provide information via the network 105, for example to select content items for display on the computing device 125 based at least in part on the format of the content items and the format of a request for content to display at the computing device 125. The computer system 400 of FIG. 4 comprises one or more processors 420 communicatively coupled to memory 425, one or more communications interfaces 405, and one or more output devices 410 (e.g., one or more display units) and one or more input devices 415. The processors 420 can be included in the data processing system 110 or the other components of the system 100 such as the content matching module 130 or the placement criteria generation module 135.

In the computer system 400 of FIG. 4, the memory 425 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the content matching module 130, the placement criteria generation module 135, or the database 140 can include the memory 425 to store content items, information indicating the format of the content items, requests for content, or information indicating the input format of requests for content. The processor(s) 420 shown in FIG. 4 may be used to execute instructions stored in the memory 425 and, in so doing, also may read from or write to the memory various information processed and or generated pursuant to execution of the instructions.

The processor 420 of the computer system 400 shown in FIG. 4 also may be communicatively coupled to or control the communications interface(s) 405 to transmit or receive various information pursuant to execution of instructions. For example, the communications interface(s) 405 may be coupled to a wired or wireless network, bus, or other communication means and may therefore allow the computer system 400 to transmit information to or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 400. Examples of communications interfaces 405 include user interfaces.

The output devices 410 of the computer system 400 shown in FIG. 4 may be provided, for example, to allow information to be viewed or perceived in connection with execution of the instructions. The input device(s) 415 may be provided, for example, to allow a user to make manual adjustments, make selections, enter data or other information, or interact in any of a variety of manners with the processor during execution of the instructions. Additional information relating to a general computer system architecture that may be employed for various systems discussed herein is provided at the conclusion of this disclosure.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

For situations in which the systems discussed herein collect personal information about users, or may make use of information about users, the users may be provided with an opportunity to control whether programs or features that may collect user information (e.g., information about a user's social network, social actions or activities, a user's preferences, or a user's current location), or to control whether or how to receive content from a content server of other data processing systems that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the users may have control over how information is collected about them and used by the content server.

The terms "data processing apparatus" "data processing system" "module" "engine" or "computing device" encompass apparatus, devices, and machines for processing data, including by way of example a programmable processor, a computer, a system on a chip, or multiple ones, or combinations, of the foregoing. The apparatuses can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content matching module 130 and the placement criteria generation module 135 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing systems such as system 400 or system 100 can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

The implementation details described herein should not be construed as limitations on the scope of what may be claimed, but rather as descriptions of features specific to particular implementations of the systems and methods described herein. Certain features that are described in this specification in the context of separate implementations can also be implemented in combination in a single embodiment or implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content matching module 130 and the placement criteria generation module 135 can be a single module, a logic device having one or more processing circuits, part of a search engine, or part of a content placement system such as an ad server.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementation," "an alternate implementation," "various implementation," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, the search results can be displayed on information resources other than a landing web page, or in other formats such as simple text listings. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A computer implemented method of providing information for use in a computer network-based content placement campaign, comprising:
    determining, by a data processing system, responsive to a request received via a computer network from a content provider computing device to generate placement criteria, a first criterion based on a first search query provided by the content provider computing device, the first search query including a keyword;
    determining, by the data processing system, a second criterion based on search results identified by the data processing system responsive to the first search query provided by the content provider computing device;
    generating, by the data processing system, the placement criteria including one of the first criterion based on the first search query provided by the content provider computing device and the second criterion based on the identified search results, the generated placement criteria excluding the keyword provided with the first search query;
    subsequent to generating the placement criteria, receiving, by the data processing system from a computing device via the computer network, a second search query;
    selecting, by the data processing system responsive to the second search query, a content item of the content placement campaign using the generated placement criteria; and
    providing, by the data processing system, the selected content item as a candidate for display on an information resource at the computing device.

2. The method of claim 1, further comprising:
    receiving a third search query from a second computing device, the third search query including a criterion of the generated placement criteria; and
    providing, responsive to the third search query and based on the generated placement criteria, the content item as a candidate for display on a second information resource via the computer network, wherein the plurality of content items does not include the content item.

3. The method of claim 1, comprising:
    identifying, by the data processing system, responsive to the first search query provided by the content provider computing device and based on the keyword, the search results, the search results not including the content item; and
    receiving the second search query including the keyword.

4. The method of claim 1, further comprising:
    receiving a third search query, the third search query including a criterion of the placement criteria; and
    identifying the content item of the content provider as responsive to the third search query.

5. The method of claim 1, comprising:
    receiving a third search query, the third search query including a criterion of the placement criteria, the keyword absent from the third search query; and
    identifying the content item of the content provider as responsive to the third search query.

6. The method of claim 1, wherein generating the placement criteria further comprises:
    including the first criterion and the second criterion in the placement criteria.

7. The method of claim 1, further comprising:
    subsequent to providing the identified search results, receiving, from the content provider computing device, the request to generate the placement criteria at the data processing system.

8. The method of claim 7, wherein the data processing system receives the request to generate the placement criteria responsive to user manipulation of a placement criteria generation interface of the content provider computing device.

9. The method of claim 1, wherein generating the placement criteria further comprises:
    using criteria from a plurality of search queries including the first search query to generate the placement criteria.

10. The method of claim 1, wherein the second search query includes a criterion of the placement criteria.

11. A system of providing information via a computer network, comprising:
    one or more data processors; and one or more storage devices storing instructions that when executed by the one or more data processors, cause the one or more data processors to perform operations comprising:
    determining, responsive to a request via the computing network from a content provider computing device to generate placement criteria, a first criterion based on a first search query provided by the content provider computing device, the first search query including a keyword;
    determining a second criterion based on search results identified by the data processing system responsive to the first search query provided by the content provider computing device;
    generating the placement criteria including one of the first criterion based on the first search query provided by the content provider computing device and the second criterion based on the identified search results, the placement criteria excluding the keyword provided with the first search query;
    subsequent to generating the placement criteria, receiving, via the computer network from a computing device, a second search query;
    selecting, responsive to the second search query, a content item of the content placement campaign using the generated placement criteria; and
    providing the selected content item as a candidate for display on an information resource at the computing device.

12. The system of claim 11, wherein the instructions that when executed by the one or more data processors, cause the one or more data processors to perform operations comprising:
    providing the identified search results for display at the content provider computing device; and receiving, from the content provider computing device, the request to generate the placement criteria at the data processing system.

13. The system of claim 11, wherein the instructions that when executed by the one or more data processors, cause the one or more data processors to perform operations comprising:
receiving a third search query including a criterion of the placement criteria; and
providing, responsive to the third search query and based on the generated placement criteria, a second content item as a candidate for display on a second computing device via the computer network, wherein the identified search results does not include the second content item.

14. A computer readable storage device storing instructions that when executed by one or more data processors, cause the one or more data processors to perform operations comprising:
determining, responsive to a request to generate placement criteria received via a computer network from a content provider computing device to generate placement criteria, a first criterion based on a first search query provided by the content provider computing device;
determining a second criterion based on the search results identified by the data processing system responsive to the first search query provided by the content provider computing device;
generating the placement criteria, the placement criteria including one of the first criterion based on the first search query provided by the content provider computing device and the second criterion based on the identified search results, the placement criteria excluding the keyword provided with the first search query;
subsequent to generating the placement criteria, receiving, from a computing device via the computer network, a second search query;
selecting, responsive to the second search query, a content item of the content placement campaign using the generated placement criteria; and
providing the selected content item as a candidate for display on an information resource at the computing device.

15. The method of claim 1, comprising:
receiving, by the data processing system via the computer network, the first search query from the content provider computing device, the first search query used to generate placement criteria that place content items of the computer network-based content placement campaign implemented by a content provider.

16. The method of claim 1, comprising:
identifying, by the data processing system, responsive to the first search query provided by the content provider computing device and based on the keyword, the search results including a plurality of content items.

17. The method of claim 1, comprising:
providing, by the data processing system, a placement criteria generation interface for display at the content provider computing device; and
providing, by the data processing system, for display on a display document of the placement criteria generation interface, the search results identified by the data processing system responsive to the first search query.

18. The method of claim 1, comprising:
providing, by the data processing system, a placement criteria generation interface for display at the content provider computing device; and
receiving, by the data processing system and based on input into the placement criteria generation interface from the content provider computing device, the request to generate the placement criteria.

19. The method of claim 1, comprising:
providing, by the data processing system, a placement criteria generation interface for display at the content provider computing device;
providing, by the data processing system, for display on a display document of the placement criteria generation interface, the search results identified by the data processing system responsive to the first search query; and
receiving, by the data processing system and based on input into the placement criteria generation interface from the content provider computing device, the request to generate the placement criteria responsive to the display of the search results at the content provider computing device.

20. The system of claim 11, wherein the instructions that when executed by the one or more data processors, cause the one or more data processors to perform operations comprising:
receiving, via the computer network, the first search query from the content provider computing device, the first search query including the keyword and used to generate the placement criteria that place content items of the computer network-based content placement campaign implemented by a content provider;
identifying, responsive to the first search query provided by the content provider computing device and based on the keyword, search results including a plurality of content items; and
receiving, from the content provider computing device, the request to generate placement criteria used to place the content items of the computer network-based content placement campaign.

21. The system of claim 11, wherein the instructions that when executed by the one or more data processors, cause the one or more data processors to perform operations comprising:
providing, by the data processing system, a placement criteria generation interface for display at the content provider computing device;
providing, by the data processing system, for display on a display document of the placement criteria generation interface, the search results identified by the data processing system responsive to the first search query; and
receiving, by the data processing system and based on input into the placement criteria generation interface from the content provider computing device, the request to generate the placement criteria responsive to the display of the search results at the content provider computing device.

22. The computer readable storage device of claim 14, wherein the instructions that when executed by the one or more data processors, cause the one or more data processors to perform operations comprising:
receiving, via the computer network, the first search query from the content provider computing device, the first search query including the keyword and used to generate the placement criteria that place content items of the computer network-based content placement campaign implemented by a content provider;
identifying, responsive to the first search query provided by the content provider computing device and based on the keyword, search results including a plurality of content items; and receiving, from the content provider computing device, the request to generate placement criteria used to place the content items of the computer network-based content placement campaign.

23. The computer readable storage device of claim 14, wherein the instructions that when executed by the one or more data processors, cause the one or more data processors to perform operations comprising:
   providing, by the data processing system, a placement criteria generation interface for display at the content provider computing device;
   providing, by the data processing system, for display on a display document of the placement criteria generation interface, the search results identified by the data processing system responsive to the first search query; and
   receiving, by the data processing system and based on input into the placement criteria generation interface from the content provider computing device, the request to generate the placement criteria responsive to the display of the search results at the content provider computing device.

* * * * *